Patented Oct. 22, 1929

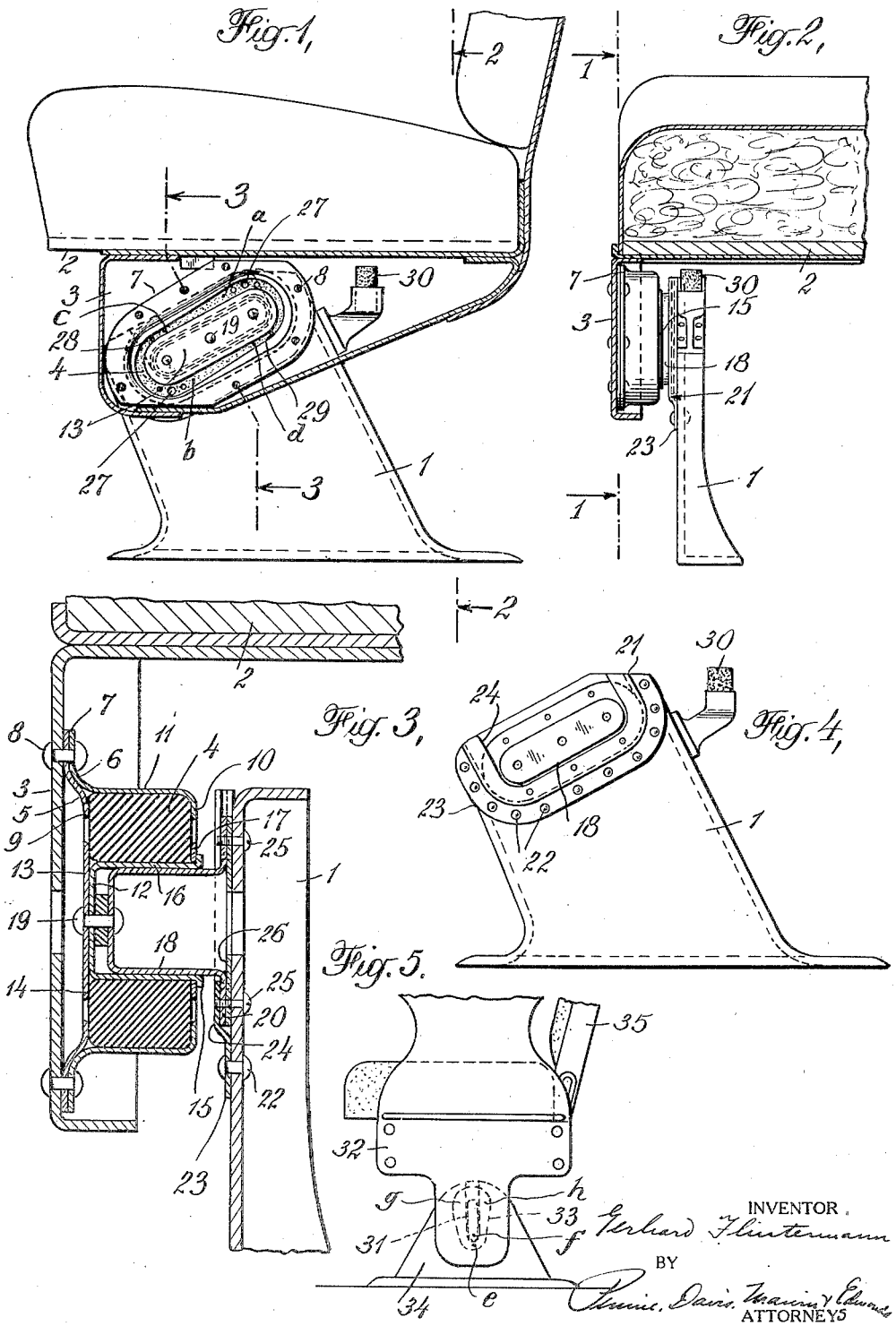

1,732,647

UNITED STATES PATENT OFFICE

GERHARD FLINTERMANN, OF ORANGE, NEW JERSEY

SEAT

Application filed April 28, 1927. Serial No. 187,157.

This invention relates to seats such as used in theatres, railway cars, automobile busses, trucks and similar places, and has for its object to provide a seat for such purposes which is yieldingly or resiliently supported in an improved manner.

Many attempts have been made to devise a thoroughly practical, resiliently supported seat which would have the desired movement but so far little progress has been made.

It has been proposed to yieldingly support seats of various kinds by utilizing springs, but the use of springs is expensive; it is difficult to adapt them to the small confines of a seat, and moreover they have an objectionable rebound.

According to this invention the seat is supported on one or more flexible joints, between the two relatively movable parts of which there is interposed a body of flexible material such as rubber or leather.

It has been proposed to use rubber blocks for supporting seats of automobile busses, trucks and the like, but in none of the arrangements already proposed does there occur the advantageous peculiar motion and action which are possible by the construction and arrangement of parts to be herein described.

In the accompanying drawings

Fig. 1 is a transverse section of a seat constructed in accordance with the invention, the section being taken on the line 1—1 of Fig. 2;

Fig. 2 is a partial longitudinal section taken on the line 2—2 of Fig. 1;

Fig. 3 is a partial longitudinal section taken on the line 3—3 of Fig. 1;

Fig. 4 is a side view of one of the seat standards showing how one of the joint members may be connected with it, and Fig. 5 is a more or less diagrammatic view showing how the invention may be applied to a reversible seat.

Referring first to Figs. 1 to 4 inclusive the seat has a standard 1 located at each end of the seat. Only one of the standards appears in the drawing, but it will be understood that the parts shown at one end of the seat in the drawing may be duplicated for the other end.

The bottom 2 of the seat at each end has a bracket or web 3 which may be of sheet metal, and one of the flexible joints is interposed between each of the brackets 3 and the corresponding standard 1. One part of the flexible joint is shown connected to the bracket 3 and the other part to the standard 1.

The body of flexible material 4, located between the two members of the joint may be made of rubber, leather or the like. It preferably has the form of a flattened or elongated annulus, as shown in Fig. 1. The outermost member of the joint is secured to the web or bracket 3 and engages the outer portion of the annulus of flexible material, and the innermost member of the joint is secured to the standard 1 and engages the inner portion of the annulus.

The inner and outer members of the joint are preferably made of sheet metal. The outer member, for convenience, may be made of two plates 5 and 6 so shaped and assembled that the resulting composite structure has a flange 7 which may be riveted, or otherwise fastened to the seat bracket or web 3 as shown at 8, and also has side flanges 9 and 10 and an intervening wall 11 the three of which form an interior seat for receiving and gripping the outer edge portion of the body of flexible material.

The inner edge of the annulus of flexible material is received and gripped by two sheet metal plates 12 and 13 riveted or otherwise fastened together, and so shaped as to provide side flanges 14 and 15 and an intervening wall 16. The wall 16 fits the central opening in the annulus of flexible material and the side flanges 14 and 15 grip and hold the inner edge portion of the annulus.

If desired a washer or ring 17 may be interposed between the flange 15 and the body of flexible material. The composite metal member formed as just described may be conveniently fastened to the standard 1 by employing the instrumentalities now to be described. The opening in the composite inner member 12—13 receives the closed end of a stamped or drawn, elongated, cup-shaped metal part 18. The closed end of the cup-shaped part 18 may be riveted or otherwise fastened to the plates 12 and 13 as shown at 19. The open end of the cup-shaped part 18 has a flange 20 which is adapted to slip sidewise into a pocket member 21 riveted or otherwise secured to the standard 1 as shown at 22.

Fig. 4 shows the cup-shaped member 18 separated from the rest of the joint and makes it clear how its flange 20 is received by the pocket member 21. The shape of the pocket member 21 is also made clear by this figure. It may be simply a substantially U-shaped strip of metal having a flange 23 which may be riveted to the standard as just described and having an off-set pocket-like portion 24 to receive the flange 20 of the cup member 18. If desired, screws 25 may be employed as semi-permanent means for more securely holding the cup-shaped member in the pocket. These screws may pass through the flange of the cup-shaped member and through the wall of the pocket as shown in Fig. 3. If desired a shim 26 may be located in the pocket between the flange 20 of the cup-shaped member and the standard 1.

An entire joint may be secured to each of the brackets 3 of the seat and then the seat may be mounted on the standards simply by inserting the flanges 20 of the cup-shaped members 18 into the pocket members 21 on the standards and then applying the screws 25. When the screws 25 are removed the seat may be readily separated from the standards and the parts of the joints inspected or repaired.

It is preferable to have the major axis of the joint inclined as shown in Fig. 1, and it is desirable to have the joint located, with respect to the front and back of the seat, in about the position shown in Fig. 1. Under these circumstances the bracket 3 acts as a lever arm to transmit the tilting load to the joint and the load will be properly distributed to the flexible material and the opposing faces of the joint will be in the proper positions to handle the load effectively.

The body of flexible material allows vertical movement of the seat with respect to the standards and is also allows pivotal movement. The seat, when occupied, will tend to pivot around the center of the joint. The outer member will move with the bracket 3 and the inner member will remain stationary. When the seat tilts backwardly the flexible material will be compressed in the vicinity of the points marked $a$ and $b$. The flexible material, near these places may be provided with openings 27 to make it more compressible and to permit the material to flow.

In view of the fact that the greatest relative movement between the two parts of the joint will take place near the points marked $a$ and $b$ the edges of the flanges 14 and 15 are shown farther from the edges of the flanges 9 and 10 near these points than at points $c$ and $d$. The annulus of flexible material may be divided into several portions, as shown at 28 and 29.

A rubber stop 30 may be employed, if desired, to yieldingly limit the backward tilting movement of the seat.

Fig. 5 shows how the invention can be applied to a seat having a reversible back 35 such as commonly used on railway cars. In this figure the joint is arranged on end. The inner member 31 is fastened to the side of the seat 32 and the outer member 33 of the joint is fastened to the standard 34. In this way the vertical load compresses the flexible material at $e$ and the seat is yieldingly supported for vertical movement. When the seat tilts, it fulcrums about an axis located near the point marked $f$ and the maximum compression of the flexible material takes place, either near the point marked $g$ or the point marked $h$, depending upon the direction in which the seat tilts. The flexible material may be made thicker, if desired, near the points $g$ and $h$ than elsewhere.

The elongated shape of the joint enables a cushioning effect to be obtained over a large area in spite of the fact that the joint occupies a small space.

The joint is compact and may be located entirely under the seat so that it is not necessary to sacrifice any foot-room. It not only permits the seat to tilt back, but it permits of an up and down or vertical movement of the seat, thus insuring maximum comfort. When rubber is used as the flexible material there is no objectionable rebound, such as occurs when springs are employed.

While the elongated type of joint is preferable other types may be used. The joint itself forms the subject matter of a copending application Serial No. 187,156, filed April 28, 1927. That application discloses various forms which the flexible joint may take and any of those forms may be used in place of the ones described herein.

The joint may be associated with the seat in other ways than described above. For instance, if one end of the seat is next to a wall it might be desirable to attach one member of the joint directly to the wall. The exact manner of attaching the joint to the parts of the complete seat is immaterial as long as the arrangement is such that the operation will be substantially as described above.

As to those claims which are directed broadly to a seat having a flexible joint in which a body of flexible material permits a combined vertical movement of the seat and a backward tilting movement thereof, this application is a continuation in part of an application filed by me on February 18, 1926, Serial No. 89,251 in which this broad subject matter is disclosed but not claimed.

I claim:

1. A seat comprising two members, namely a frame and a support therefor, the frame being capable of a vertical movement and a backward tilting movement with respect to the support, an elongated annulus of non-metallic resilient material interposed between said frame and support, one of said members having associated with it an element which engages with the outer circumferential portion of the resilient material and the other member having associated with it an element which engages with the inner circumferential portion of the resilient material, the annulus of resilient material being positioned so that the axis of its opening is substantially horizontally disposed whereby a portion of the annulus will be placed under direct compression by the vertical load.

2. A seat comprising two members namely a frame and a support therefor, the frame being capable of a vertical movement and a tilting movement with respect to the support, an annular body of non-metallic resilient material interposed between said frame and support, one of said members of the seat having associated with it an element which engages with the outer circumferential portion of the resilient material and the other member having associated with it an element which engages with the inner circumferential portion of the resilient material, the annulus of resilient material being positioned so that the axis of its opening is substantially horizontally disposed, whereby a portion of the annulus will be placed under direct compression by the vertical load.

3. A seat comprising two members namely a frame and a support therefor, the frame being capable of a vertical movement and a tilting movement with respect to the support, non-metallic resilient material interposed between the frame and the support, said resilient material comprising an upper portion and a lower portion, both elongated in a direction from the front to the rear of the seat, one of said members of the seat having a structure associated with it a part of which engages the upper surface of the upper portion of the resilient material and a part of which engages the lower surface of the lower portion of the resilient material, said parts of said structure being inter-connected at the front and rear ends of the resilient material, and the other member of the seat having a structure associated with it a part of which projects laterally between the upper and lower portions of the resilient material and engages the lower surface of the said upper portion and the upper surface of said lower portion, said structures being interconnected only through the intermediary of the resilient material whereby the resilient material permits the vertical movement of the said frame and the tilting movement thereof.

In testimony whereof I affix my signature.

GERHARD FLINTERMANN.